United States Patent [19]

Yamada

[11] Patent Number: 5,521,719
[45] Date of Patent: May 28, 1996

[54] COMMUNICATION APPARATUS HAVING IMPROVED GROUP 3 FACSIMILE SUBADDRESS COMMUNICATION FUNCTION

[75] Inventor: Toshiaki Yamada, Yamato, Japan

[73] Assignee: Ricoh Company, Ltd., Tokyo, Japan

[21] Appl. No.: 210,939

[22] Filed: Mar. 21, 1994

[30] Foreign Application Priority Data

Mar. 22, 1993 [JP] Japan ................................. 5-060808
Jun. 11, 1993 [JP] Japan ................................. 5-140251

[51] Int. Cl.⁶ ............................................. H04N 1/32
[52] U.S. Cl. ........................... 358/438; 358/435; 358/440; 379/100
[58] Field of Search ................................. 358/402, 403, 358/405, 406, 434–440, 442, 468; 379/93–96; 370/61; H04N 1/00, 1/32

[56] References Cited

U.S. PATENT DOCUMENTS

| | | | |
|---|---|---|---|
| 5,142,568 | 8/1992 | Ogata et al. | 358/442 |
| 5,166,975 | 11/1992 | Maei | 379/100 |
| 5,189,525 | 2/1993 | Kotani | 358/434 |
| 5,189,695 | 2/1993 | Maei | 379/100 |
| 5,220,599 | 6/1993 | Sasano et al. | |
| 5,251,044 | 10/1993 | Ikegaya | 358/440 |
| 5,263,082 | 11/1993 | Kotake et al. | |
| 5,361,299 | 11/1994 | Izumi | 379/100 |

FOREIGN PATENT DOCUMENTS

| | | |
|---|---|---|
| 4-117744 | 4/1992 | Japan . |
| 4-223656 | 8/1992 | Japan . |

*Primary Examiner*—Kim Yen Vu
*Attorney, Agent, or Firm*—Oblon, Spivak, McClelland, Maier & Neustadt

[57] ABSTRACT

A communication procedure executing unit executes a predetermined communication procedure using subaddress frame(s). A mail distributing unit distributes electronic mail through the group 3 facsimile communication in the predetermined communication procedure. A subaddress extracting unit extracts information concerning a subaddress(es) previously set in the given subaddress frame(s). An address specifying unit specifies addresses to which the mail distributing unit distributes the electronic mail, the specification being performed using the extracted subaddress(es).

12 Claims, 12 Drawing Sheets

FIG. 11

| SUBADDRESS EXISTENCE | PROCEDURE NUMBER | PROCESSING PROCEDURE |
|---|---|---|
| NON-EXIST | 01 | OUTPUT TO ATTACHED PRINTER |
| | 02 | OUTPUT TO PRINTER OF LAN IP ADDRESS xx.xx.xx.xx |
| | 03 | OUTPUT TO FACSIMILE OF WAN ADDRESS xx⋯xx |
| | 04 | OUTPUT TO ELECTRONIC MAIL ADDRESS 'Fax Kanri @ mail' AS ELECTRONIC MAIL |
| | ⋮ | ⋮ |

FIG. 12

| SUBADDRESS EXISTENCE | PROCEDURE NUMBER | PROCESSING PROCEDURE |
|---|---|---|
| EXIST | 11 | OUTPUT TO ATTACHED PRINTER |
| | 12 | OUTPUT TO PRINTER OF LAN IP ADDRESS xx.xx.xx.xx |
| | 13 | OUTPUT TO FACSIMILE OF WAN ADDRESS xx⋯xx |
| | 14 | OUTPUT TO ELECTRONIC MAIL ADDRESS 'Fax Kanri @ mail' AS ELECTRONIC MAIL |
| | ⋮ | ⋮ |
| | 19 | SUBADDRESS INDIVIDUALLY PROCESSING |
| | ⋮ | ⋮ |

| SUBADDRESS | PROCEDURE NUMBER | LED ADDRESS | PROCEDURE |
|---|---|---|---|
| 1234567 | 22 | XX.XX.XX.XX | OUTPUT TO PRINTER OF LED ADDRESS (IP ADDRESS) |
| 1234568 | 23 | 0300001234 | OUTPUT TO FACSIMILE DEVICE OF LED ADDRESS (WAN ADDRESS) |
| 1234569 | 24 | Fax Kanri @ mail | OUTPUT TO LED ADDRESS (ELECTRONIC MAIL ADDRESS) AS ELECTRONIC MAIL |
| 0300001234 | 23 | 0300001234 | OUTPUT TO FACSIMILE DEVICE OF LED ADDRESS (WAN ADDRESS) |
| XX.XX.XX.XX | 22 | XX.XX.XX.XX | OUTPUT TO PRINTER OF LED ADDRESS (IP ADDRESS) |

COMMUNICATION APPARATUS HAVING IMPROVED GROUP 3 FACSIMILE SUBADDRESS COMMUNICATION FUNCTION

BACKGROUND OF THE INVENTION

1. Field of the Invention

The present invention relates to a communication apparatus such as facsimile mail apparatus and simple facsimile apparatus performing the group 3 facsimile communication, and in particular relates to a communication apparatus having the group 3 subaddress communication functions recently standardized by CCITT (international telegraph and telephone consultative committee), recommendation No.Q.931.

2. Related Art

A communication apparatus such as a facsimile apparatus has been used in an office in general and it has been used for electronic mailing operation in an increasing number of cases, together with popularization of various computers such as personal computers and workstations and development of LAN (local area networks). Problems may occur in such an environment as that where facsimile mail systems have been widely used. The problems may occur due to the following reasons: In the standard communication network, facsimile apparatuses are connected to a so-called WAN (wide area network) such as PSTN (public switched telephone network) or ISDN (integrated service digital network) while personal computers and workstations using the electronic mailing function are connected to a LAN. The two network types WAN and LAN have different address systems. Japanese Laid-Open Patent Application No. 4-117744 discloses a technology of an electronic mail apparatus, which technology may be effective to cope with the problematic condition of the address system mismatch. By using the technology, if the operator intends to send electronic mail data to a certain facsimile apparatus(es) through a personal computer, workstation or the like and via the facsimile function, the operator could report the destination facsimile apparatus address(es) to a facsimile server through the personal computer, workstation or the like. Thus, the electronic mail data is then distributed to the desired destination facsimile apparatus(es) from the facsimile server apparatus.

Japanese Laid-Open Patent Application No. 4-223656 discloses a facsimile apparatus to which personal electronic mail destination addresses may be given, the facsimile apparatus receiving facsimile data which is to be distributed to the personal electronic mail destination addresses as electronic mail. By reporting the fact of the facsimile-data reception to the personal electronic mail destination addresses, the relevant persons may get the facsimile data from the facsimile apparatus.

However, a communication apparatus such as the disclosed facsimile apparatus to which the users may give personal destination addresses should have comprised a facsimile apparatus, such as the group 4 facsimile apparatus, which is connected to ISDN and should not have been one, such as the group 3 facsimile apparatus, which can be connected only to PSTN. This is because the standard communication procedure used in the group 3 facsimile apparatus is based on the CCITT recommendation international standard and the relevant address reporting function has not been standardized in the CCITT recommendation.

In a facsimile mail system in the related art having a document storing and interchanging function, a facsimile mail apparatus may receive various-service request from a simple facsimile apparatus. If the operator intends to request to perform a facsimile mail distribution operation to the facsimile mail apparatus, the operator inputs the relevant destination address(es) for the main distribution. The destination address to be input in ISDN or the like may comprise as follows, for example: destination user identification numbers, telephone numbers, or simultaneous multi-address group identification numbers for general transmission cases; destination user identification numbers or PO box numbers for PO box transmission cases; and bulletin board system (BBS) numbers for bulletin board transmission cases.

If the operator intends to request mail distribution operation to a group 3 facsimile apparatus connected to a telephone network such as the PSTN, a PB (pushbutton) signal is used to input destination addresses. Such a procedure is used because communication apparatuses used in the facsimile mail system mainly comprise group 3 facsimile apparatuses. Further, the above procedure is used because a subaddress transmission/reception procedure has not been provided in the standardized procedure.

Recently, a procedure in which a subaddress(es) is(are) transmitted/received by group 3 facsimile communication apparatuses has been standardized in the CCITT recommendation. For a group 3 facsimile communication apparatus using the procedure, mail distribution destinations may be specified using a subaddress(es), easy and reliable mail distribution service ordering being thus implemented.

The group 4 facsimile apparatus disclosed in the above Japanese Laid-Open Patent Application No.4 -223656 problematically rejects incoming facsimile data which contains no subaddress. Further, since this facsimile apparatus treats all incoming facsimile data as mail data which is, as a result, to be distributed to the specified mail destinations, the incoming facsimile data is not printed unless the operator inputs a printing instruction to the apparatus. Such an operation manner may inconvenience an operator who wishes to get the relevant mail as printed matter. Another problem is that a person who has no electronic mail address cannot receive any electronic mail through this facsimile apparatus. Another problem is that since the apparatus manages all received facsimile data as electronic mail, the apparatus is required to have a construction containing a complete proper electronic-mail processing function, the apparatus being thus large scale.

SUMMARY OF THE INVENTION

An object of the present invention is to provide a group 3 facsimile communication apparatus having an easily-usable and reliable electronic-mail distribution function.

In order to achieve the above object, communication system according to the present invention comprises:

communication procedure executing means for executing a predetermined communication procedure using subaddress frame(s);

mail distributing means for distributing electronic mail through the group 3 facsimile communication in said predetermined communication procedure;

subaddress extracting means for extracting information concerning a subaddress(es) previously set in the given subaddress frame(s); and address specifying means for specifying addresses to which said mail distributing means distributes the electronic mail, the specification being performed using the extracted subaddress(es).

By the above construction, the relevant image information may be distributed to the remote facsimile apparatus of the addresses specified by the subaddress(es). In comparison to the ordering (that is, electronic mail distribution requesting) system in the related art using the PB signal or the like, electronic mailing can be easily and surely performed, thus the reliability of the electronic mail distribution function being improved.

The above communication apparatus preferably further comprise:

type identifying means for identifying a subaddress type of said subaddress(es) as one of normal subaddress type, PO box number type, and bulletin board system number type; and wherein said address specifying means specifies the addresses using the identification result provided by said type identifying means in accordance with said subaddreses.

As a result, the relevant image information may be distributed to remote facsimile apparatuses by means of the single group 3 facsimile apparatus even if the remote facsimile apparatuses' addresses are specified by addresses of any type, the bulletin board system number type or PO box number type as well as the normal subaddress (indicating a normal address to be used in the electronic mailing) type.

The above apparatus preferably further comprise apparatus-type extracting means for extracting information concerning apparatus types of remote apparatuses to which the relevant electronic mail is distributed, said information being previously set in said given subaddress frame(s) together with said subaddress(es). As a result, no trial and error operation is needed to find the relevant remote facsimile apparatus type (being either the group 3 facsimile type or group 4 facsimile type). Further, separate group 3 and group 4 facsimile communication ports may be provided and both the ports can be efficiently used.

Another communication apparatus according to the present invention comprises:

communication means for performing the group 3 facsimile subaddress communication operation;

determining means for determining whether or not facsimile data received through said communication means includes the group 3 facsimile subaddress(es);

subaddress processing means for processing said group 3 facsimile subaddress(es) using a predetermined procedure, if said group 3 facsimile subaddress(es) has(have) been included in said facsimile data;

storing means for storing information indicating the determination result provided by said determining means together with said facsimile data;

first registering means for previously registering a first data output manner in which said facsimile data stored in said storing means is output if the relevant determination result provided by said determining means is that no group 3 facsimile subaddress exists;

second registering means for previously registering a second data output manner in which said facsimile data stored in said storing means is output depending on the contents of said group 3 facsimile subaddress(es) if the relevant determination result provided by said determining means is that said group 3 facsimile subaddress exists;

third registering means for previously registering a third data output manner in which said facsimile data stored in said storing means is output independently of the contents of said group 3 facsimile subaddress(es) if the relevant determination result provided by said determining means is that said group 3 facsimile subaddress exists; and outputting means for outputting the data stored in said storing means in an appropriate one of said first, second and third output manners.

By the above construction, various services may be provided such as that the relevant facsimile data is distributed to the destinations depending on whether or not the international-standard group 3 facsimile subaddress accompanies the relevant facsimile data and the contents of the subaddress if it accompanies.

It is preferable that said first, second and third registering means register said first, second and third output manners so that the destinations to which said facsimile data is output comprise facsimile apparatuses. As a result, not only the service of transferring/distributing the received facsimile data to mail destinations but also the service of automatically printing output of the received facsimile data, due to the user's previous setting, using the printer accompanying the facsimile apparatus connected to the relevant communication apparatus may be provided. Thus, a user's request for the relevant data to be automatically printed out immediately after the facsimile data has been received in the same way as conventional facsimile data handling may be fulfilled.

It is also preferable that said first, second and third registering means register said first, second and third output manners so that the destinations to which said facsimile data is output comprise printers. As a result, an automatic output printing output service, due to the user's previous setting, using either the printer accompanying the relevant communication apparatus or a printer connected to LAN may be provided. Thus, a user's request for the relevant data to be automatically printed out immediately after the facsimile data has been received in the same way as conventional facsimile data handling may be fulfilled. In particular, the printer connected to the LAN can be used even if the relevant communication apparatus is not provided with its own printer.

It is also preferable that said first, second and third registering means register said first, second and third output manners so that the destinations to which said facsimile data is output comprise LAN (local area network) connected apparatuses. As a result, the received facsimile data can be treated as electronic mail.

It is also preferable that said communication apparatus comprises a facsimile mail apparatus. As a result, the operator may obtain the facsimile mail function and electronic mail function together in a single apparatus.

It is also preferable that said communication apparatus comprises a facsimile apparatus. As a result, the operator may obtain the facsimile communication function and electronic mail function together in a single apparatus.

Other objects and further features of the present invention will become more apparent from the following detailed description when read in conjunction with the accompanying drawings.

BRIEF DESCRIPTION OF THE DRAWINGS

FIG. 11 shows stored-data output processes to be executed if there is no group 3 facsimile subaddress registered in a subaddress processing memory acting as a first registering means shown in FIG. 9;

FIG. 12 shows stored-data output processes to be executed if there is a group 3 facsimile subaddress registered in a subaddress processing memory acting as a first registering means shown in FIG. 9, the processes being executed independently of the relevant group 3 facsimile subaddress;

DESCRIPTION OF THE PREFERRED EMBODIMENTS

Figure 1:
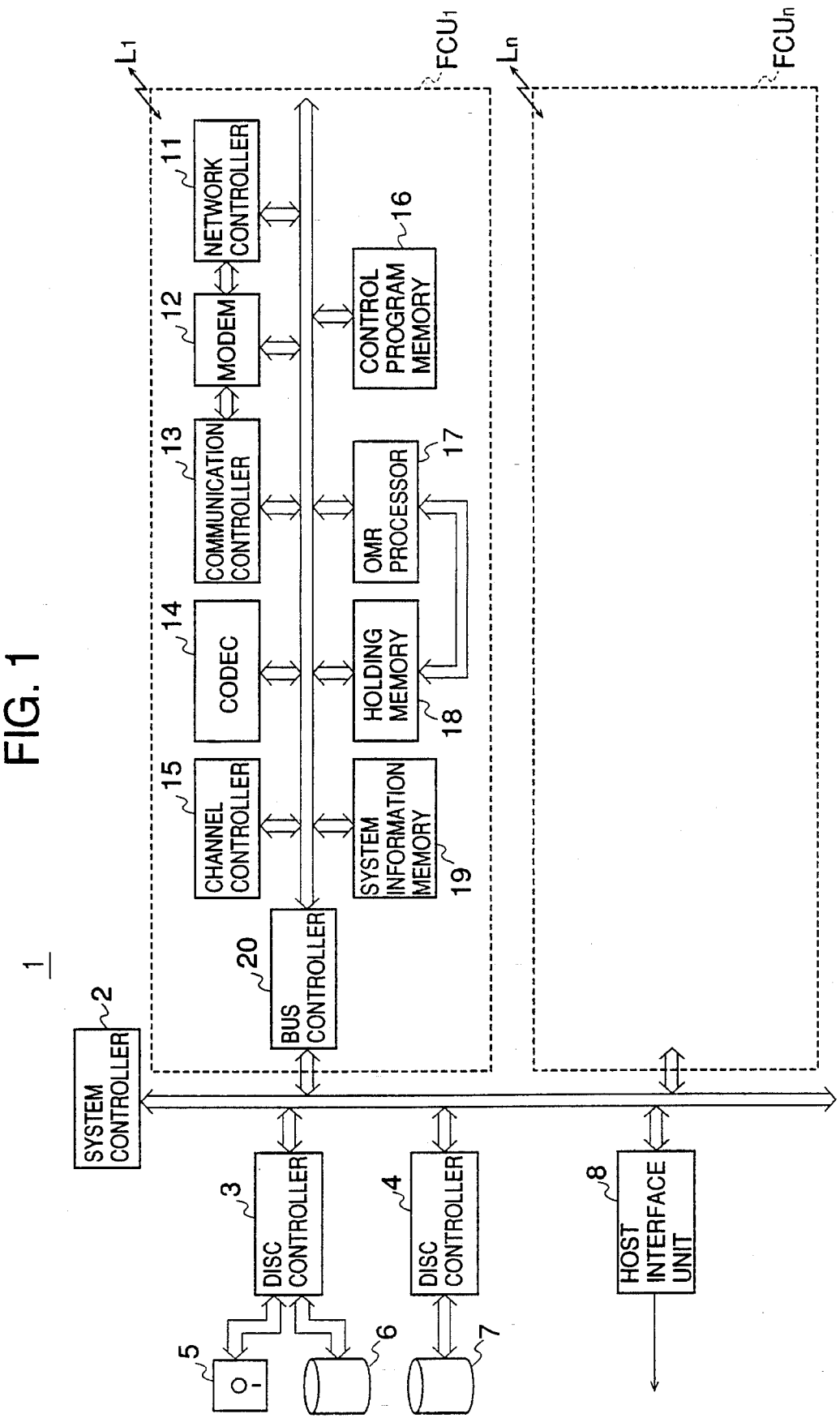
FIG. 1 shows a block diagram of a facsimile mail apparatus in any of first through fifth embodiments of the group 3 facsimile communication apparatus according to the present invention acting as an electronic-mail distributing apparatus.

The construction of a facsimile mail apparatus in any of first through fifth embodiments of the group 3 facsimile communication apparatus according to the present invention is described with reference to FIG. 1. Each facsimile mail apparatus 1 includes system controller 2, disc controllers 3 and 4, floppy disc device 5, hard disc devices 6 and 7, host interface unit 8 and communication processors $FCU_1$ through $FCU_n$.

The system controller 2 controls the respective elements in the apparatus 1 in accordance with programs read from the floppy disc device 5 or hard disc device 6 or 7 so as to execute a facsimile mail function operation sequence in the apparatus 1. In particular, the controller 2 controls writing and/or reading of image data into/from floppy disc device 5 or hard disc device 6 or 7 and also controls the respective communication processors $FCU_1$ through $FCU_n$. The facsimile mail apparatus 1 provides various function services such as a data holding for delivery function, a multiaddress calling function, a confidential communication function, a time-designated transmission function, a bulletin-board-system serve function, a PO box function, and a series transmitting function (a plurality of documents, each containing a plurality of pages, are transmitted in a single communication occasion). The controller 2 controls the communication processors $FCU_1$ through $FCU_n$ so as to cause them to execute/control these functions. An operator who intends to use any one of these services appropriately inputs predetermined instructions, for requesting the service, to the facsimile mail apparatus via an appropriate communication apparatus such as a simple facsimile apparatus connected to the relevant facsimile mail apparatus.

The disc controllers 3 and 4 drive/control the floppy disc device 5 and hard disc devices 6 and 7 so as to cause the devices to store facsimile mail function basic programs and various data such as messages transmitted via communication terminals and/or from a host apparatus such as a host computer.

The host interface unit 8 has a host apparatus such as a host computer connected thereto and controls communication between the host apparatus and the facsimile mail apparatus 1. The host apparatus to be connected to the facsimile mail apparatus may comprise various apparatuses such as another facsimile mail apparatus for example. This unit 8 may comprise a DMAC (direct memory access controller) for directly connecting the host apparatus and the facsimile mail apparatus or may comprise a communication controller for connecting the host apparatus and facsimile mail apparatus via a communication line.

The number of communication processors $FCU_1$ through $FCU_n$ corresponds to the number of communication lines which are connected to the facsimile mail apparatus 1. As shown in FIG. 1, each of the communication processors $FCU_1$ through $FCU_n$ includes network controller 11, modem 12, communication controller 13, CODEC (coder and decoder) 14, channel controller 15, control program memory 16, OMR (optical mark reader) processor 17, holding memory 18, system information memory 19 and bus controller 20.

The lines of the communication lines $L_1$ through $L_n$ are connected to the network controller 11, the respective communication lines comprising telephone lines for example. The controller 11 is a so-called AA-NCU (automatic-calling automatic-answer network control unit) and performs automatic calling and call accepting processes and so forth. The communication lines $L_1$ through $L_n$ may comprise LAN (local area network) and ISDN (integrated service digital network) alternatively for example.

The modem 12 modulates a signal to be transmitted and demodulates a received signal.

The communication controller 13 performs communication of facsimile control signals between the relevant facsimile mail apparatus 1 and remote communication apparatuses such as facsimile apparatuses so as to executes the proper facsimile communication procedure.

The CODEC 14 codes given messages using a predetermined coding system and decodes given coded messages.

The control program memory 16 stores communication-processor (FCU$_1$ through FCU$_n$) basic programs and so forth. The channel controller 15 controls the respective elements in the respective one of the communication processors FCU$_1$ through FCU$_n$ in accordance with the basic program stored in the control program memory 16. Thus, the communication processor executes the proper operation sequence so as to perform the proper (facsimile) message communication operations.

The OMR processor 17 detects whether or not the received message comprises an OMR sheet message and then detects a proper mark provided on the OMR sheet from the received message if it comprises the OMR sheet. The result from the detection is then stored in the holding memory 18.

The holding memory 18 temporarily stores such OMR sheet message detection results detected by the OMR processor 17 as mentioned above and other messages other than OMR SHEET messages. The thus temporarily stored data is then transferred to the floppy disc device 5 or hard disc device 6 or 7. The holding memory 18 is also used for temporarily storing the messages read from the floppy disc device 5 or hard disc device 6 or 7. The thus temporarily stored messages are then transmitted via the communication processor (one of FCU$_1$ through FCU$_n$).

The system information memory 19 stores predetermined system information necessary for implementing the functions of the facsimile mail apparatus 1. The system information comprises user identification numbers, destination identification numbers, destination telephone numbers and so forth, for example.

The facsimile mail apparatus 1 performs facsimile communication with the remote group 3 communication apparatus(es) acting as mail transmission apparatus(es) via the respective one(s) among the communication lines L$_1$ through L$_n$. The facsimile mail apparatus 1 which receives a service provision request from the remote communication apparatus via the communication line interprets the thus received request and then provides the relevant service. In the related art, the address of the message indicating the service provision request may be specified by using an OMR sheet, tone signal or the like. However, in any of the first through fifth embodiments of the present invention, the same address is specified by using a subaddress provided in a newly provided subaddress frame processed in the communication procedure.

The facsimile mail apparatus 1 in the first embodiment of the present invention is now described. The communication processors FCU$_1$ through FCU$_n$ accept group 3 facsimile mail distribution service requests in the facsimile mail apparatus 1. The newly prepared subaddress frame(s) is(are) used for setting a desired subaddress(es) therein and received in the above request acceptance. The communication controller 13 extracts the thus set subaddress(es) from the subaddress frame(s). The thus extracted subaddress(es) are reported to the system controller 2 via the bus controller 20. The system controller 2 acting as destination address determining means then determines the relevant mail distribution destination addresses.

The relevant communication procedure executed by the communication controller 13 is described with reference to FIG. 2. The subaddress(es) used in the apparatus 1 is(are) set in the subaddress frame(s) SUB and received by the facsimile mail apparatus 1. First, in a phase A of a call setting and line probability sequence, a remote group 3 facsimile apparatus 31 acting as a mail transmission apparatus sends calling tone CNG and the relevant facsimile mail apparatus 1 responds thereto with a called end identification signal CED. Thus, the relevant call has been set. Then, in a phase B of a preliminary process before image information communication, the facsimile mail apparatus 1 sends a digital identification signal DIS. By means of the signal DIS, the facsimile mail apparatus 1 reports to the group 3 facsimile apparatus 31 that the facsimile mail apparatus 1 can accept subaddress(es). The group 3 facsimile apparatus 31 sends the subaddress in the subaddress frame SUB before sending a digital command signal DCS. The group 3 facsimile apparatus 31 which has thus sent the subaddress frame SUB reports the start of a training operation, sending a training check signal TCF so as to train the modem 12 in the facsimile mail apparatus 1. If the training has succeeded, the facsimile mail apparatus 1 sends a reception preparation confirmation signal CFR and then executes a facsimile mail transmission phase C sequence not shown in the figure.

An operation flow of a process performed by each one of the communication processors FCU$_1$ through FCU$_n$ is described with reference to FIG. 3. If the communication controller FCU$_i$ receives a call in a step S1 (a term 'step' will be omitted, hereinafter), the controller checks whether or not the calling tone CNG has been received in S2. If the controller has received the calling tone CNG in S2, the controller sends the called end identification signal CED in S3. Then, the controller sends the digital identification signal DIS indicating to able to receive the subaddress(es) in S4. The controller FCU$_i$ waits for receiving the subaddress frame(s) SUB in S5. If the controller has received the subaddress frame(s) SUB in S5, the thus received subaddress frame(s) is(are) extracted by the communication controller 13 in S6. The subaddress frame(s) SUB is(are) then transferred to the system controller 2 in S7. As will be described with reference to FIG. 4, the system controller 2 then checks whether or not the transferred subaddress frame(s) SUB comprises(comprise) a proper one. Depending on the properness/improperness check result, the communication controller 13 determines whether or not to receive the relevant image information in S8. If it is determined to receive in S8, the reception procedure phase B sequence starting from the digital command signal DCS sending shown in FIG. 2 is executed in S9. After the reception completion, the relevant circuit established via the line L$_i$ among the lines L$_1$ through L$_n$ is cut in S10. Thus, the current process is terminated. On the other hand, if it is determined in S8 not to receive, the relevant established circuit via the line L$_i$ is immediately cut in S10 and the current process is terminated.

If it is determined in S2 that no calling tone CNG has been received, it is determined that the accepted call is a request for another ordering (requesting) operation. Then, if the ordering operation comprises ordering process by means of a PB signal for example, the relevant ordering process is performed in S11. If no subaddress frame SUB has been received as determined in S5, it is determined that the received CNG signal has been sent for requesting another ordering operation. Then, if the ordering operation comprises ordering process using an OMR sheet for example, the relevant ordering process is performed in S12.

An operation performed by the system controller 2 is described with reference to FIG. 4. In (step) T1, if the system controller 2 receives the subaddress frame(s) SUB from the communication controller 13 in S7 of FIG. 3, the system controller 2 checks the properness of the subaddress frame(s) SUB in T2. If the subaddress(es) is(are) proper one(s), the controller 2 instructs the communication controller 13 to continue the subsequent reception process in T3 and instructs it to execute the image information reception process in T4. Then, image information is received via the $FCU_i$ and is stored in the floppy disc device 5 or hard disc device 6 or 7. Further, the subaddress(es) in the subaddress frame(s) SUB is(are) registered as an ordinary transmission destination(s) in T5 relevant to the thus received image information. Thus, the current process is terminated. If T2 determines the subaddress(es) in the subaddress frame(s) SUB to be improper, the controller 2 instructs the communication controller 13 to cut the relevant communication circuit and the current process is terminated.

The system controller 2 which has thus accepted the mail distribution service request using the subaddress(es) set in the subaddress frame(s) SUB then determines the relevant mail distribution destination address(es) using the subaddress(es). The controller 2 then causes the communication processor(s) $FCU_i$ among the communication processors $FCU_1$ through $FCU_n$ to distribute the stored image information to the relevant address(es). Thus, in the present first embodiment, the facsimile mail apparatus 1 receives the subaddress frame(s) SUB from the group 3 facsimile apparatus 31, then distributes the relevant image information to the destination(s) at the address(es) determined using the subaddress(es). Thus, mail distribution services can be provided simply and reliably compared with the mail ordering (that is, requesting mail distribution) operations in the related art such as using PB signals or the like.

The second embodiment of the communication apparatus according to the present invention is described.

Figure 2:
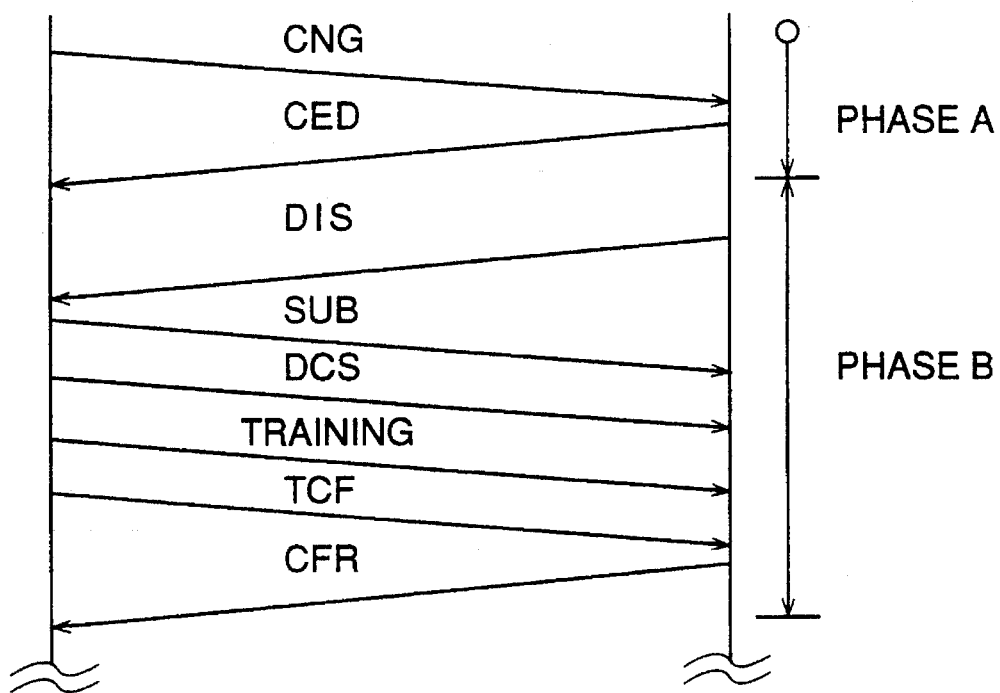
FIG. 2 shows an operation flow of a group 3 facsimile subaddress communication procedure in a communication controller shown in FIG. 1.
Figure 3:
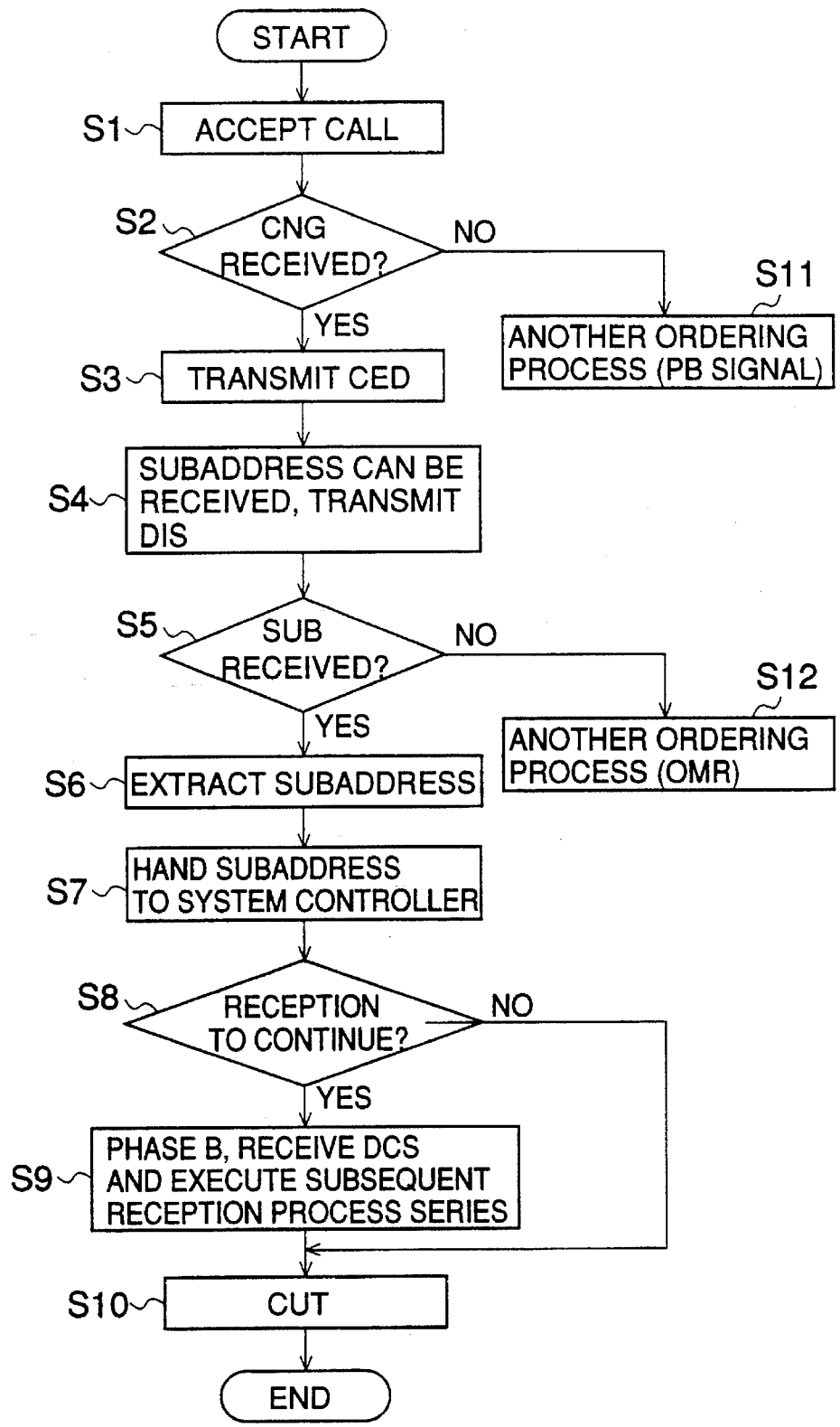
FIG. 3 shows an operation flow of a process performed by a communication processor shown in FIG. 1.

In FIG. 2, the subaddress frame(s) SUB supplied by the group 3 facsimile apparatus 31 is(are) used as a PO box number(s) and the facsimile mail apparatus 1 in the second embodiment then determines mail distribution destination address(es) using the PO box number(s).

Figure 5:
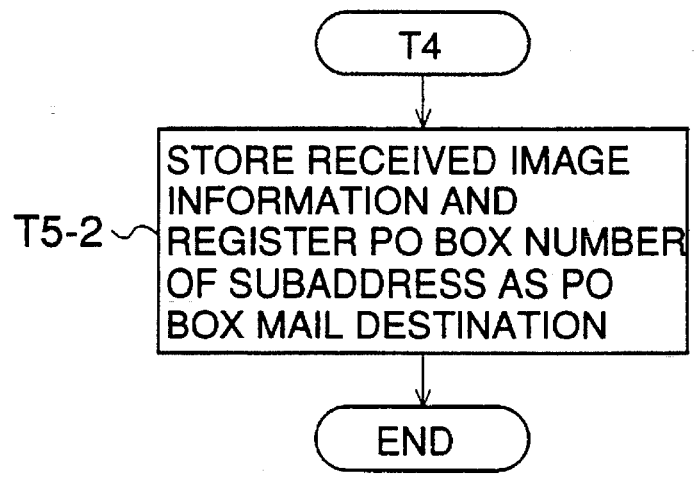
FIG. 5 shows an operation flow of a part of a process performed by the system controller shown in FIG. 1, the part indicating features of the second embodiment of the present invention and being an alternative to a step T5 of FIG. 4.

Operation in the second embodiment is described with reference to FIG. 5.

Figure 4:
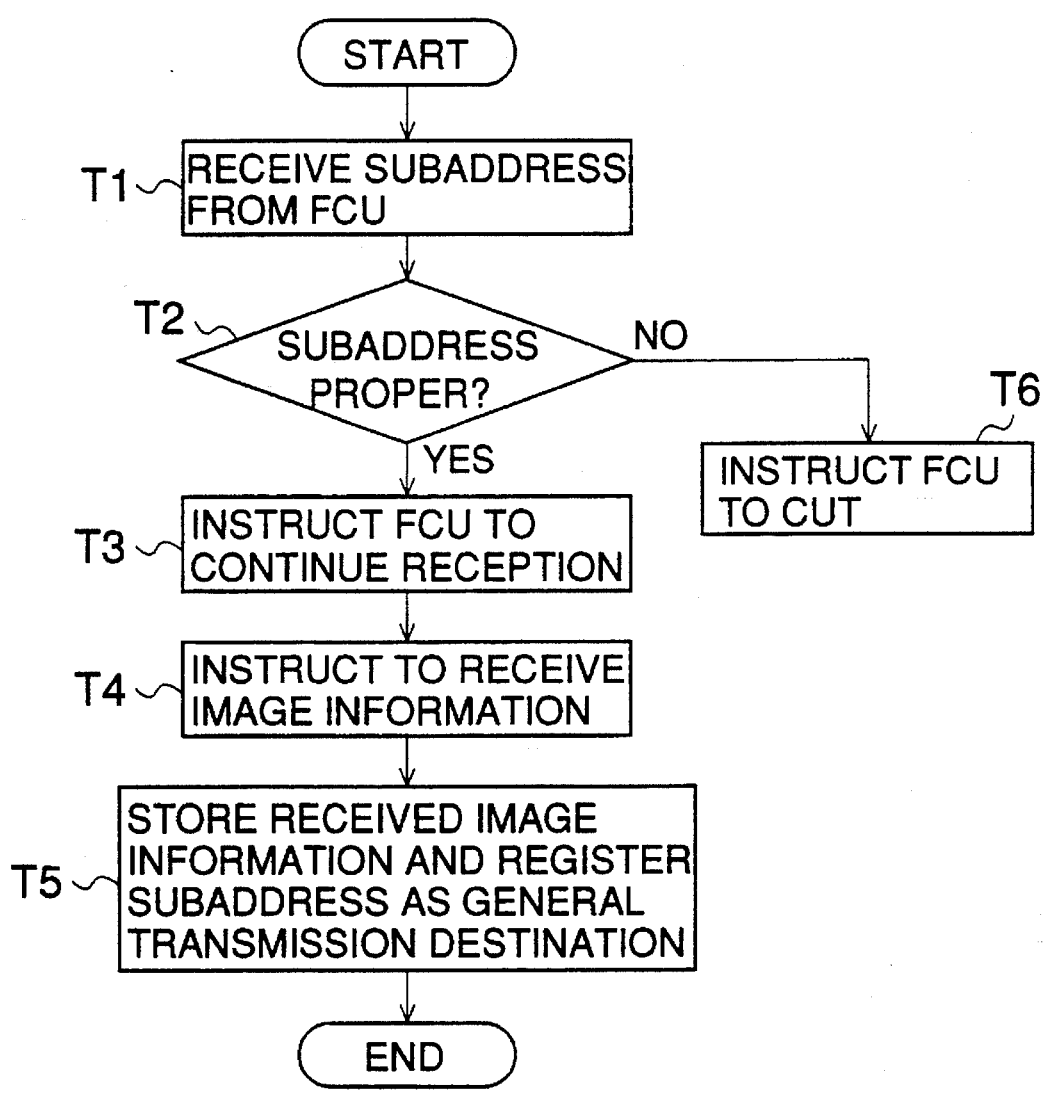
FIG. 4 shows an operation flow of a process performed by a system controller shown in FIG. 1 in the first embodiment of the present invention.

In the second embodiment, after the system controller 2 instructs to receive image information in T4 of FIG. 4, the image information received via the communication processor $FCU_i$ is stored in the floppy disc device 5 or hard disc device 6 or 7. Further, the subaddress(es), set in the subaddress frame(s) SUB, acting as the PO box number(s) is(are) registered as PO box mail destination(s) relevant to the received and stored image information in T5-2. Then, the current process is terminated.

The system controller 2, which has accepted the mail distribution service request accompanied by the subaddress frame(s) SUB containing the PO box number(s), then determines the mail distribution destination address(es) using the subaddress(es) set in the subaddress frame(s) SUB acting as the PO box number(s). The controller 2 then causes the communication processor(s) $FCU_i$ among the communication processors $FCU_1$ through $FCU_n$ to distribute the stored image information to the relevant address(es). Thus, in the present second embodiment, the facsimile mail apparatus 1 receives the subaddress frame(s) SUB (containing the PO box number(s)) from the group 3 facsimile apparatus 31, then distributes the relevant image information to the destination address(es) determined using the PO box number(s). Thus, mail distribution services can be provided simply and reliably compared with the mail ordering operations in the related art such as using PB signals or the like.

The third embodiment of the communication apparatus according to the present invention is described.

In FIG. 2, the subaddress(es) set in the subaddress frame(s) SUB reported by the group 3 facsimile apparatus 31 is(are) used as a bulletin board system number(s) and the facsimile mail apparatus 1 in the third embodiment then determines mail distribution destination address(es) using the bulletin board system number(s).

Figure 6:
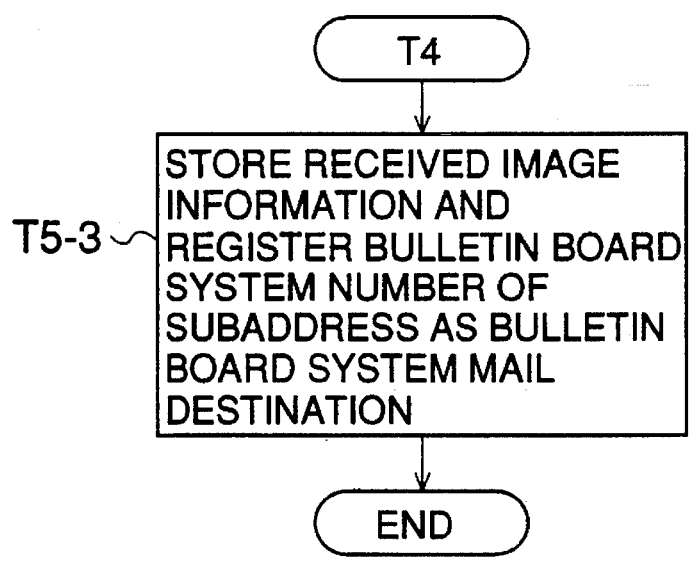
FIG. 6 shows an operation flow of a part of a process performed by the system controller shown in FIG. 1, the part indicating features of the third embodiment of the present invention and being an alternative to a step T5 of FIG. 4.

Operation in the third embodiment is described with reference to FIG. 6.

In the third embodiment, after the system controller 2 instructs to receive image information in T4 of FIG. 4, the image information received via the communication processor $FCU_i$ is stored in the floppy disc device 5 or hard disc device 6 or 7. Further, the subaddress(es), set in the subaddress frame(s) SUB, acting as the bulletin board system number(s) is(are) registered as the bulletin board system mail destination(s) relevant to the received and stored image information in T5-3. Then, the current process is terminated.

The system controller 2 which has accepted the mail distribution service request accompanied by the subaddress frame(s) SUB containing the bulletin board system number(s), then, determines the mail distribution destination address(es) using the subaddress(es), set in the subaddress frame(s) SUB, acting as the bulletin board system number(s). The controller 2 then causes the communication processor(s) $FCU_i$ among the communication processors $FCU_1$ through $FCU_n$ to distribute the stored image information to the relevant address(es). Thus, in the present third embodiment, the facsimile mail apparatus 1 receives the subaddress frame(s) SUB (containing the bulletin board system number(s)) report from the group 3 facsimile apparatus 31, then distributes the relevant image information to the destination address(es) determined using the bulletin board system number(s). Thus, mail distribution services can be provided simply and reliably compared with the mail ordering operations in the related art such as using PB signals or the like.

The fourth embodiment of the communication apparatus according to the present invention is described.

A construction of the facsimile mail apparatus in the fourth embodiment is described. In FIG. 1, the system controller 2 acts as identifying means for determining the type of the subaddress(es) set in the subaddress frame(s) SUB, namely simple subaddress(es), subaddress(es) acting as PO box number(s) (simply referred to as PO box number(s), hereinafter), or subaddress(es) acting as bulletin board system number(s) (simply referred to as bulletin board system number(s), hereinafter). Then, the relevant distribution address(es) using both the above determination result and the subaddress(es) acting as the simple subaddress(es), PO box number(s) or bulletin box system number(s).

Figure 7:
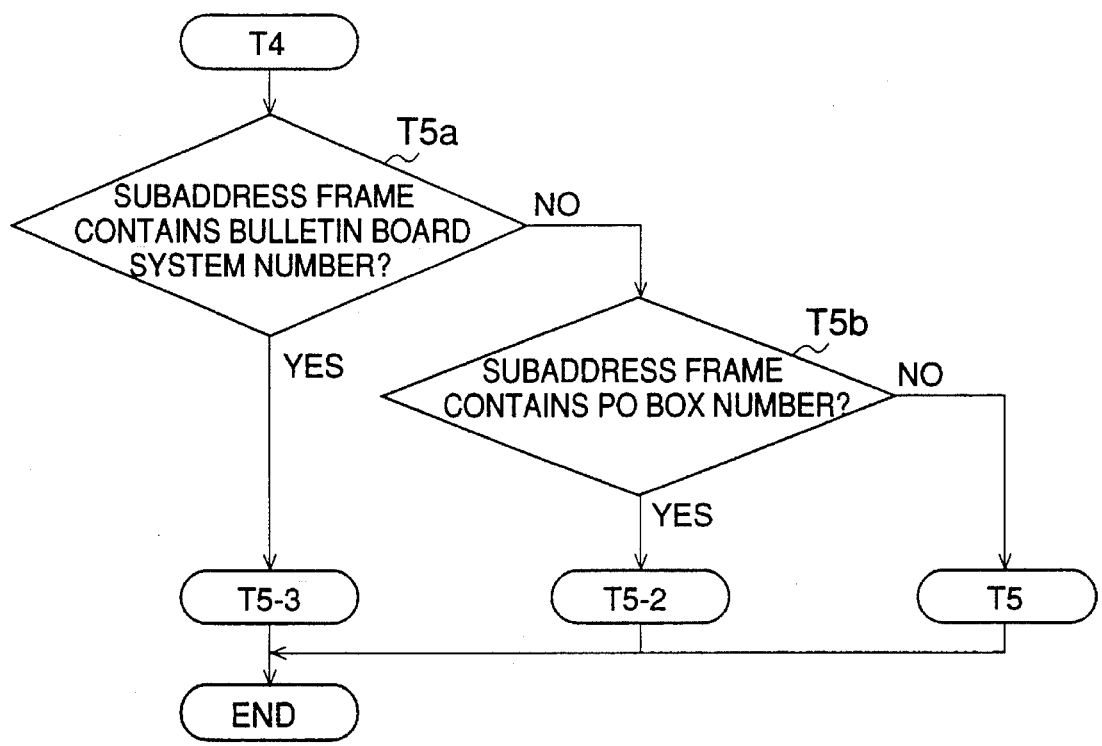
FIG. 7 shows an operation flow of a part of a process performed by the system controller shown in FIG. 1, the part indicating features of the fourth embodiment of the present invention and being an alternative to a step T5 of FIG. 4.

Operation in the facsimile mail apparatus in the fourth embodiment is described with reference to FIG. 7. After the system controller 2 instructs to receive image information in T4 of FIG. 4, the controller 2 checks in T5a whether the subaddress(es) set in the subaddress frame(s) SUB comprises the bulletin board system number(s). If it comprises the bulletin board system number(s) in T5a, the image information received through the communication processor $FCU_i$ is stored into the floppy disc device 5, or hard disc device 6 or 7 and also the subaddress(es), set in the subaddress frame(s) SUB, acting as the bulletin board system number(s) is(are) registered as the bulletin board system mail destination(s) relevant to the received and stored image information, as the process of T5-3 in FIG. 6. Then, the current process is terminated.

On the other hand, if T5a determines that the type of the relevant subaddress(es) set in the subaddress frame(s) SUB is not a bulletin board system number(s), the controller 2 checks in T5b whether the subaddress frame(s) SUB contains the PO box number(s). If it comprises the PO box number(s) in T5b, the image information received through the communication processor $FCU_i$ is stored into the floppy disc device 5, or hard disc device 6 or 7 and also the subaddress(es), set in the subaddress frame(s) SUB, acting as the PO box number(s) is(are) registered as the PO box mail destination(s) relevant to the received and stored image information, as the process of T5-2 in FIG. 5. Then, the current process is terminated.

On the other hand, if T5b determines that the type of the relevant subaddress frame(s) does not contain the PO box number(s), the image information received through the communication processor $FCU_i$ is stored into the floppy disc device 5, or hard disc device 6 or 7 and also the subaddress(es) is(are) registered as the ordinary transmission destination(s) relevant to the received and stored image information, as the process of S5 in FIG. 4. Then, the current process is terminated.

The system controller 2, which has accepted the mail distribution service request accompanied by the subaddress frame(s) SUB containing the simple subaddress(es), bulletin board system number(s), or PO box number(s), then determines the mail distribution destination address(es) using the subaddress(es) acting as the simple subaddress(es), bulletin board system number(s), or PO box number(s). The controller 2 then causes the communication processor(s) $FCU_i$ among the communication processors $FCU_1$ through $FCU_n$ to distribute the stored image information to the relevant address(es). Thus, the facsimile mail apparatus 1 in the fourth embodiment receives the subaddress frame(s) SUB (containing the simple subaddress(es), bulletin board system number(s), or PO box number(s)) supplied by the group 3 facsimile apparatus 31, then distributes the relevant image information to the destination address(es) determined using the simple subaddress(es), bulletin board system number(s), or PO box number(s). Thus, mail distribution services can be provided simply and reliably compared with the mail ordering operations in the related art such as using PB signals or the like. Further, the single facsimile mail apparatus 1 can handle different types of information set in the subaddress frame(s) SUB.

The facsimile mail apparatus 1 in the fifth embodiment of the communication apparatus according to the present invention is described.

The construction thereof is described. In FIG. 1, the communication controller 13 extracts information set in the subaddress frame(s) together with the subaddress(es). The information to be extracted concerns the type of apparatus(es) to which the relevant image information is to be distributed. The type of apparatus may comprise one of two types, the group 3 facsimile type and the group 4 facsimile type. The facsimile mail apparatus 1 previously recognizes the apparatus type and as a result the apparatus 1 can determine which of the group 3 facsimile match procedure or the group 4 facsimile match procedure is to be executed without using any trial and error process therefor, thus achieving speedy procedure determination. Thus, in this embodiment, the subaddress frame(s) SUB contains(contain) the apparatus type information as well as the subaddress(es).

Operation of the facsimile mail apparatus 1 in the fifth embodiment is described with reference to FIG. 8.

Figure 8:
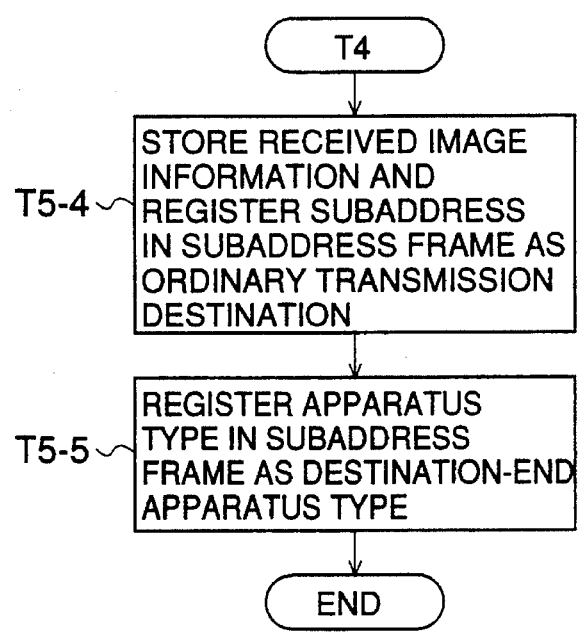
FIG. 8 shows an operation flow of a part of a process performed by the system controller shown in FIG. 1, the part indicating features of the fifth embodiment of the present invention and being an alternative to a step T5 of FIG. 4.

After the system controller 2 instructs to receive image information in T4 of FIG. 4, the image information received through the communication processor $FCU_i$ is stored into the floppy disc device 5, or hard disc device 6 or 7 and also the subaddress(es), set in the subaddress frame(s) SUB together with the apparatus type information, is(are) registered as the ordinary transmission destination(s) relevant to the received and stored image information, in T5-4 in FIG. 8. Then, the accompanying apparatus type information is registered as the destination apparatus type information in T5-5. Then, the current process is terminated.

The system controller 2 which has accepted the mail distribution service request accompanied by the subaddress frame(s) SUB containing the apparatus type information as well as the subaddress(es), then, determines the mail distribution destination address(es) using the subaddress set in the subaddress frame(s) SUB. The controller 2 also determines, using the accompanying apparatus type information, as to which of the group 3 facsimile apparatus(es) or group 4 facsimile apparatus(es) the destination-end apparatus(es) comprises(comprise). The controller 2 then causes the communication processor(s) $FCU_i$ among the communication processors $FCU_1$ through $FCU_n$ to distribute the stored image information to the relevant address(es). Thus, the facsimile mail apparatus 1 in the fifth embodiment receives the subaddress frame(s) SUB (containing the relevant destination-end apparatus type information as well as the subaddress(es)) from the group 3 facsimile apparatus 31, then distributes the relevant image information to the destination address(es) determined using the subaddress(es) set in the subaddress frame(s) SUB. Thus, mail distribution services can be provided simply and reliably compared with the mail ordering operations in the related art such as using PB signals or the like. Further, separate group 3 facsimile communication port and group 4 facsimile communication port may be provided and both the ports can be efficiently used.

An apparatus in a sixth embodiment of the communication apparatus according to the present invention is described.

The construction thereof is described. The apparatus in the sixth embodiment comprises the group 3 facsimile apparatus which sends a mail distribution request to the facsimile mail apparatus 1 of FIG. 1. The group 3 facsimile apparatus includes, as essential components, the network controller 11, modem 12 and communication controller 13. In addition, the group 3 facsimile apparatus includes subaddress setting means to be implemented with an operation/display unit for example. The subaddress setting means is used for setting, in the subaddress frame(s) SUB, the simple subaddress(es), PO box number(s), or bulletin board system number(s) and distribution-end apparatus type information.

Operation of the sixth embodiment is described.

The group 3 facsimile apparatus 31 having the function of accessing a facsimile mail apparatus such as the apparatus 1 of FIG. 1 has any of the simple subaddress(es), PO box number(s), and bulletin board system number(s) input thereto by the operator using the subaddress setting means which thus acts as man-machine interface device. In this input, the distribution-end apparatus type information may be also input if necessary. Then, the apparatus 31 transmits the thus input information after setting the information in the subaddress frame(s) SUB shown in FIG. 2.

After the group 3 facsimile apparatus 31 sends the mail distribution service instruction (request) including the subaddress frame(s) SUB to the facsimile mail apparatus 1, the facsimile mail apparatus 1 accepts the relevant order and then determines the mail distribution destination address(es)

using the simple subaddress(es), PO box number(s) or bulletin board system number(s) set in the subaddress frame(s) SUB. Further, if appropriate, the apparatus 1 determines, using the destination-end apparatus type information, which of the group 3 facsimile apparatus(es) or group 4 facsimile apparatus(es) the destination-end apparatus(es) comprises(comprise). Then, the apparatus 1 accordingly distributes the relevant image information received from the group 3 facsimile apparatus 31 by causing the appropriate communication processor(s) $FCU_i$ among the processors $FCU_1$ through $FCU_n$ to execute the proper communication procedure. Thus, mail distribution services can be provided simply and reliably compared with the mail ordering operations in the related art such as using PB signals or the like.

Figure 9:
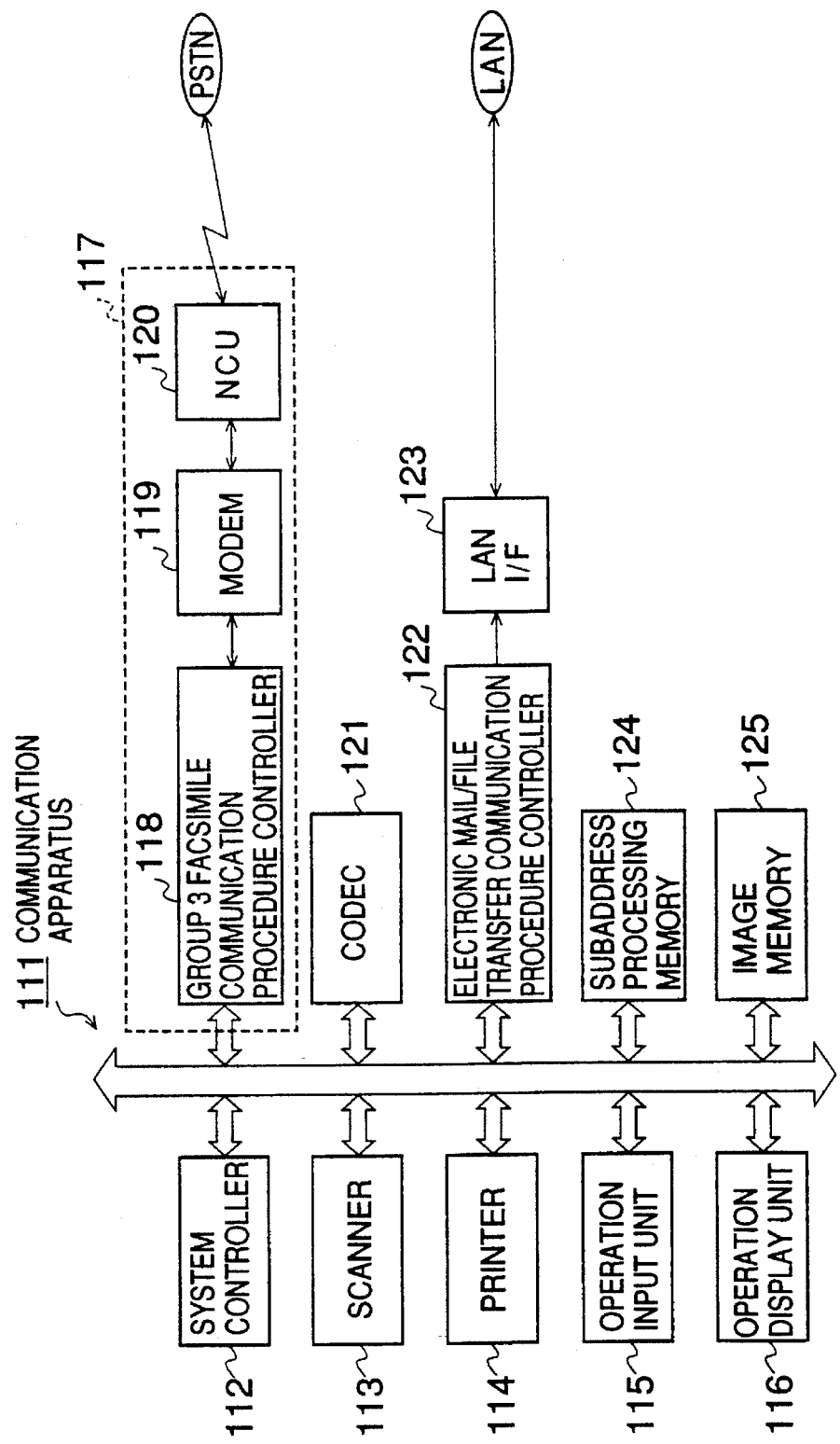
FIG. 9 shows a block diagram of a communication apparatus in a seventh embodiment of the present invention.

A communication apparatus in a seventh embodiment of the communication apparatus according to the present invention is described with FIG. 9.

The communication apparatus 111 includes a system controller 112 for controlling the operation of the apparatus 111 in accordance with a predetermined program. The apparatus 111 also includes a scanner 113 for reading in, at a predetermined resolution, image information of a document set thereon, the thus read information being then used for transmission or for image duplication. The apparatus 111 also includes a printer 114 for printing the image information read in by the scanner 113, received facsimile data, mail information and so forth. The apparatus 111 also includes an operation input unit 115 for inputting operation instructions to the apparatus 111 by manipulating operation keys provided thereon. The operation keys provided in the operation input unit 115 comprise various function keys, numeric keypad, keyboard and so forth. The apparatus 111 also includes an operation display unit 116 consisting of an LCD (liquid crystal display), LED (light emitting diode) or the like for displaying the operation state of the apparatus 111, other messages and so forth.

The apparatus 111 also includes a facsimile communication unit 117 for performing facsimile communication via a wide area network, PSTN and is provided with group 3 facsimile communication procedure controller 118, modem 119 and NCU (network control unit) 120. The group 3 facsimile communication procedure controller 118 is used for performing facsimile communication in accordance with the group 3 facsimile procedure and has the group-3-facsimile-subaddress (internationally standardized by the CCITT) communication function. The modem 119 modulates a signal to be transmitted and demodulates the modulated received signal. The NCU 120 performs line control so as to establish a telephone circuit to be used for the facsimile communication and also cut the once established circuit. Assuming that the communication apparatus 111 comprises a simple facsimile apparatus, it is sufficient that the facsimile communication unit 117 includes a single block for a single circuit to be established. On the other hand, assuming that the communication apparatus 111 comprises a facsimile mail apparatus, the facsimile communication unit 117 needs to include multiple blocks for multiple circuits to be established accordingly. The apparatus 111 also includes a CODEC 121 for coding, in a predetermined coding method, image information to be transmitted so as to compress the relevant information amount and decoding coded received image information so as to reproduce the original image information.

The apparatus 111 also includes electronic mail/file transfer communication procedure controller 122. The controller 122 performs communication control in order to transfer electronic mail and file information to an appropriate terminal connected to the LAN. In the seventh embodiment, received facsimile data is assumed to be used as electronic mail information without performing any modification thereon. The apparatus 111 also includes a LAN-I/F (interface) 123 provided between the electronic mail/file transfer communication procedure controller 122 for performing data input/output control.

The apparatus 111 also includes a subaddress processing memory 124 for previously storing received-facsimile-data processing procedures relevant to the contents of the group-3-facsimile subaddress(es) received via the facsimile communication unit 117. The processing procedures are previously registered using the operation input unit 115 by the operator. The apparatus 111 also includes image memory 125 for storing received facsimile data and the memory 125 may also be used for storing electronic mail information and file information.

Figure 10:
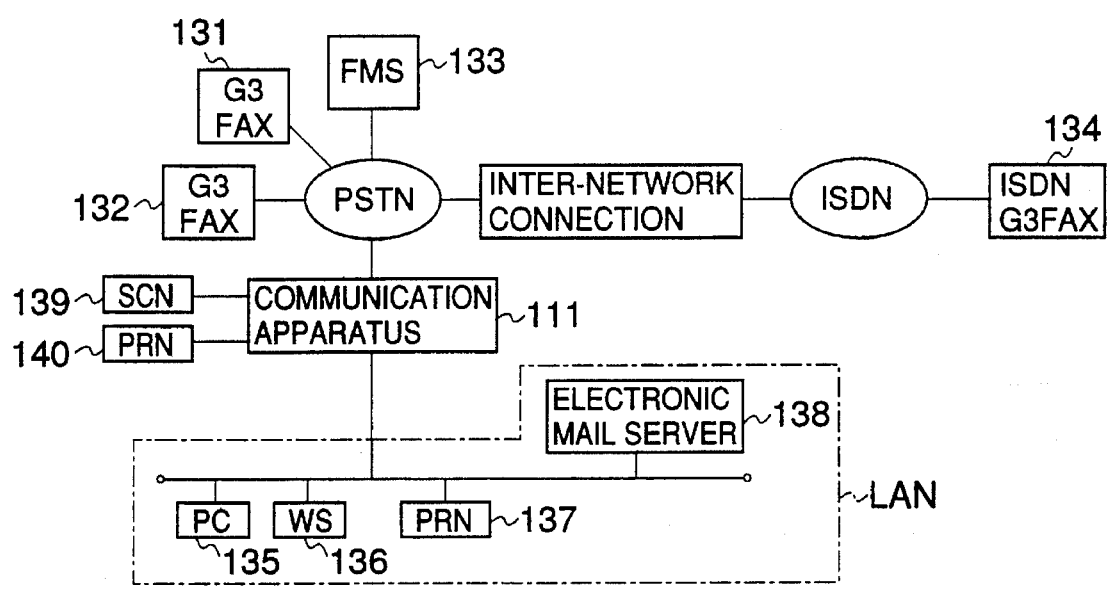
FIG. 10 shows a block diagram of a network system example containing the communication system of FIG. 9.

As shown in FIG. 10, the communication apparatus 111 is connected to both the PSTN and LAN. Thus, the communication apparatus 111 may be used for performing communication with remote group 3 facsimile apparatus (FAX) 131, 132 and facsimile mail apparatus (FMS) 133 via the PSTN. The communication apparatus 111 may also be used for performing communication with a group 3 facsimile apparatus 134 acting as an ISDN terminal apparatus via the ISDN connected to the PSTN in the inter-network connection manner.

The communication apparatus 111 may also be used for performing communication with LAN connected terminal apparatus such as PC (personal computer) 135, WS (workstation) 136, printer (PRN) 137, and electronic mail server 138, via the LAN.

Assuming that the communication apparatus 111 comprises a facsimile apparatus, the apparatus 111 contains scanner 113 and printer 114 therein as shown in FIG. 9, similar to the conventional construction. On the other hand, assuming that the communication apparatus 111 comprises a facsimile mail apparatus, the apparatus 111 is externally provided with the scanner 139 and printer 140, if the provision is necessary, as shown in FIG. 10. Further, in the majority of cases, the communication apparatus 111 acting as the facsimile mail apparatus is externally provided with operation input unit 115 and operation display unit 116 shown in FIG. 9, the unit 115 and 116 together forming a console. Concretely, in one example, the electronic mail/file transfer communication procedure controller 122 has a device emulator communication procedure control function so as to enable using the PC 135 or the WS 136 shown in FIG. 10 as the operation input unit 115 and operation display unit 116.

In FIG. 9, the group 3 facsimile communication procedure controller 118 has a group-3-facsimile subaddress communication function and determines whether or not the group-3-facsimile subaddress is contained in facsimile data if the facsimile data has been received. If the determination result is that the group-3-facsimile subaddress is present, the group 3 facsimile communication procedure controller 118 interprets the existing group-3-facsimile subaddress. Then, the received facsimile data as well as the above (subaddress present/not present) determination result and the interpreted result are stored in the image memory 125.

Manners in which the thus stored data is to be processed are previously registered in the subaddress processing memory 124 acting as first, second and third registering means. Manners in which the stored data is transferred if no group-3-facsimile subaddress exists are previously registered in the subaddress processing memory 124 acting as the first registering means. The registered contents are described with reference to FIG. 11 for example. As shown in the figure, the relevant procedures comprise:

A number 01 procedure process is to output the relevant facsimile data to the attached printer 114 (thus the printer 114 prints the relevant facsimile data);

a number 02 procedure process to output the relevant facsimile data to the printer 137 together with specifying the proper LAN IP (internet protocol) address (thus the relevant facsimile data is printed by the printer 137 acting as the LAN connected device);

a number 03 procedure process to output the relevant facsimile data to the group 3 facsimile apparatus 131 for example together with specifying the proper WAN address (telephone number) (thus the relevant facsimile data is printed by the printer provided in the group 3 facsimile apparatus 131); and a number 04 procedure process to output the relevant facsimile data as electronic mail to the electronic mail server 138 or PC 135 connected to the LAN, specifying the proper address (thus the relevant facsimile data is stored in the either the devices 138 and 135 acting as the LAN connected device and is handled as electronic mail information).

If the operator previously inputs the process procedure number 01, 02, 03 or 04 using the operation input unit 115, the relevant transfer process procedure instruction as mentioned above is registered as a procedure of transfer process to be performed on facsimile data received without any group-3-facsimile subaddress accompanying the facsimile data. Thus, if facsimile data accompanied by no group-3-facsimile subaddress is received, the relevant facsimile data is automatically transferred to the destination in accordance with the registered transfer process procedure instructions. The system controller 112 acting as output control means is used for this purpose and if the number 01 procedure process instructions were registered for example, the system controller 112 executes a transfer process in which the attached printer 114 is determined to be a printer device to which the relevant facsimile data is to be transferred. On the other hand, if either the number 02 or 04 procedure process instructions were registered for example, the mail/file transfer communication procedure controller 122 is used for performing the transfer process in which the printer 137 or electronic mail server 138 is determined to be a LAN connected device to which the relevant facsimile data is to be transferred. If the number 03 procedure process instructions were registered for example, the group 3 facsimile communication procedure controller 118 is used for performing the transfer process in which the group 3 facsimile apparatus 131 is determined to be a facsimile apparatus to which the relevant facsimile data is to be transferred.

Thus, the subaddress processing memory 124 may be used for registering various transfer process procedures in which a facsimile device or a printer device connectable to the relevant communication apparatus 111 is used as a device to which relevant facsimile data is to be transferred independent of the connection method, whether via WAN or LAN, in which the facsimile device and/or printer device is connected to the relevant communication apparatus 111. Further, independent of the type of the LAN connected device, whether printer 137 or electronic mail server 138, various transfer procedures in which the LAN connected devices connectable to the relevant communication apparatus 111 are used as devices to which relevant facsimile data is to be transferred may be registered.

Manners in which the data stored in the image memory 125 as mentioned above is to be processed are previously registered in the subaddress processing memory 124 acting as second registering means. The procedures in which the stored data is transferred if a group-3-facsimile subaddress exists are previously registered in the subaddress processing memory 124 acting as the second registering means, the transfer process being determined independent of the contents of the relevant group-3-facsimile subaddress. The registered contents are described with reference to FIG. 12 for example. As shown in the figure, the relevant procedures comprise:

A number 11 procedure process to output the relevant facsimile data to the attached printer 114 (thus the printer 114 prints the relevant facsimile data);

a number 12 procedure process to output the relevant facsimile data to the printer 137 together with specifying the proper LAN IP (internet protocol) address (thus the relevant facsimile data is printed by the printer 137 acting as the LAN connected device);

a number 13 procedure process to output the relevant facsimile data to the group 3 facsimile apparatus 131 for example together with specifying the proper WAN address (telephone number) (thus the relevant facsimile data is printed by the printer provided in the group 3 facsimile apparatus 131); and a number 14 procedure process to output the relevant facsimile data as electronic mail to the electronic mail server 138 or PC 135 connected to the LAN, specifying the proper address (thus the relevant facsimile data is stored in one of the devices 138 and 135 acting as the LAN connected device and is handled as electronic mail information).

Manners in which the data stored in the image memory 125 as mentioned above is to be processed are also previously registered in the subaddress processing memory 124 acting as the third registering means. The procedures in which the stored data is transfer if a group-3-facsimile subaddress exists are previously registered in the subaddress processing memory 124 acting as the third registering means, the transfer process being determined depending on the contents of the relevant group-3-facsimile subaddress. The process procedure number 19 shown in FIG. 12 indicates instructions to execute the procedures of transfer process to be registered in the third registering means and the contents of the third registering means are shown in FIG. 13 for example.

If the operator previously inputs the process procedure number 11, 12, 13 or 14 using the operation input unit 115, the relevant transfer process procedure instructions as mentioned above are registered as a procedure of transfer process to be performed on facsimile data received together with a group-3-facsimile subaddress accompanying the facsimile data. Thus, if facsimile data accompanied by a certain group-3-facsimile subaddress is received, the relevant facsimile data is automatically transferred to the destination in accordance with the registered transfer process procedure instructions. The system controller 112 acting as output control means is used for this purpose and if the 11 procedure process instructions were registered for example, the system controller 112 executes a transfer process in which the attached printer 114 is determined to be a printer device to which the relevant facsimile data is to be transferred. On the other hand, if either the number 12 or 14 procedure process instructions were registered for example, the electronic mail/file transfer communication procedure controller 122 is used for performing the transfer process in which the printer 137 or electronic mail server 138 is determined to be a LAN connected device to which the relevant facsimile data is to be transferred. If the number 13 procedure process instructions was registered for example, the group 3 facsimile communication procedure controller 118 is used for performing the transfer process in which the group 3 facsimile apparatus 131 is determined to be a facsimile device to which the relevant facsimile data is to be transferred.

Thus, the subaddress processing memory 124 may be used for registering various transfer process procedures in which a facsimile device or a printer device connectable to the relevant communication apparatus 111 is used as a device to which relevant facsimile data is to be transferred independent of the connection method, whether via the WAN or LAN, in which the facsimile device and/or printer device is connected to the relevant communication apparatus 111. Further, independent of the type of LAN connected device, whether printer 137 or electronic mail server 138, various transfer procedures, in which the LAN connected devices connectable to the relevant communication apparatus 111 are used as devices which relevant facsimile data is to be transferred to may be registered.

Figures 13, 14:
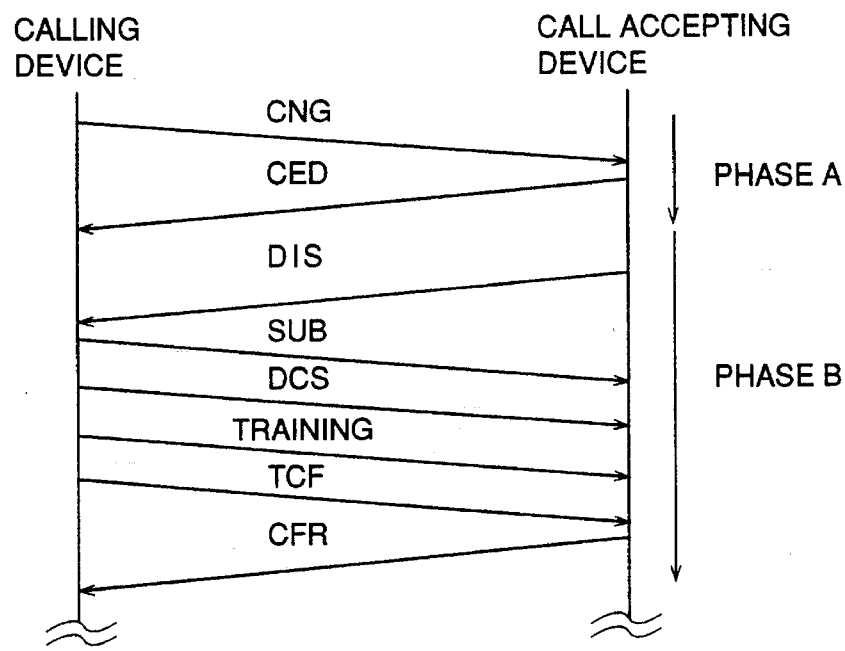
FIG. 13 shows stored-data output processes to be executed if there is a group 3 facsimile subaddress registered in a subaddress processing memory acting as a first registering means shown in FIG. 9, the processes being executed depending on the relevant group 3 facsimile subaddress.
FIG. 14 shows an operation flow of a group 3 facsimile subaddress communication procedure relevant to a communication apparatus in a seventh embodiment of the present invention.

If the above process procedure number 19 was registered, the transfer process is executed in any of the procedures shown in FIG. 13. The various procedures were previously registered as described above and thus, if one subaddress among the subaddresses shown in the figure is received together with facsimile data, then the relevant facsimile data is processed in the respective procedure among the procedures numbered 22 through 24. Thus, the appropriate device is selected in accordance with the procedure numbered with the relevant number, the relevant facsimile data being then transferred to the selected device. The various registered procedures of transfer process are as follows:

A number 22 procedure process to output the relevant facsimile data to the printer 137 together with specifying the proper LAN address (thus the relevant facsimile data is printed by the printer 137 acting as the LAN connected device);

a number 23 procedure process to output the relevant facsimile data to the group 3 facsimile apparatus 131 for example together with specifying the proper WAN address (telephone number) (thus the relevant facsimile data is printed by the printer provided in the group 3 facsimile apparatus 131); and a number 24 procedure process to output the relevant facsimile data as electronic mail to the electronic mail server 138 or PC 135 connected to the LAN, with specifying the proper address (thus the relevant facsimile data is stored in one of the devices 138 and 135 acting as the LAN connected device and is handled as the electronic mail information).

As shown in FIG. 13, a plurality of subaddresses '1234567' (the top entry of FIG. 13), 'XX XX XX XX' (the bottom entry of FIG. 13) for example in this case lead the current process to a process (that is, point to a process as the process to be performed) in the same procedure (numbered in this example). Further, it does not matter whether the contents of a subaddress corresponds to the contents of the device address to be selected by the subaddress.

If the operator intends to perform the transfer process in any of the procedures shown in FIG. 13, the operator could register the procedure number 19 and then register the procedures numbers 22 through 24. Thus, if facsimile data is received accompanied by a group-3-facsimile subaddress, the proper procedure is selected from among the procedures numbered 22 through 24 automatically in accordance with the contents of the accompanying subaddress. Then, the relevant facsimile data is transferred to the destination in accordance with the thus selected procedure. In one example, if a subaddress having the contents '1234567' is supplied, the system controller (output control means) 112 selects the procedure number 22 and causes the electronic mail/file transfer communication procedure controller 122 to execute the transfer process in which the printer 137 connected to the LAN is determined to be a printer device to which the relevant facsimile data is to be transferred. If a subaddress having the contents '1234568' is supplied for example, the system controller 112 selects the procedure number 23 and causes the group 3 facsimile communication procedure controller 118 to execute the transfer process in which the group 3 facsimile apparatus 131 is determined to be a facsimile device to which the relevant facsimile data is to be transferred. If a subaddress having the contents '1234569' is supplied in another example, the system controller 112 selects the procedure number 24 and causes the electronic mail/file transfer communication procedure controller 122 to execute the transfer process in which the electronic mail server 138 is determined to be a LAN connected device to which the relevant facsimile data is to be transferred.

Thus, the subaddress processing memory 124 may be used for registering various transfer process procedures respectively relevant to given subaddresses, in which procedures a facsimile device or a printer device connectable to the relevant communication apparatus 111 is used as a device to which relevant facsimile data is to be transferred independent of the connection method, whether via WAN or LAN, in which the facsimile device and/or printer device is connected to the relevant communication apparatus 111. Further, independent of the type of the LAN connected device, whether printer 137 or electronic mail server 138, various transfer procedures, in which the LAN connected devices connectable to the relevant communication apparatus 111 are used as devices to which relevant facsimile data is to be transferred, may be registered respectively for given subaddresses.

The communication apparatus in the seventh embodiment of the present invention is not limited to the communication apparatus 111 shown in FIG. 9 and/or FIG. 10. Other apparatuses such as a PC, WS or an electronic mail server may be the communication apparatus in the seventh embodiment by having the above-described means.

Operation of the communication apparatus 111 in the seventh embodiment is described with reference to FIG. 14. As shown in the figure, the digital identification signal DIS is sent from the call accepting device and indicates to allow to receive a relevant subaddress. The calling device sends the SUB signal containing the relevant subaddress. If the calling device does not have the capability of subaddress communication, the SUB signal transmission step in the figure is omitted and the calling device sends the digital command signal DCS as the response to the above DIS. The procedure shown in FIG. 14 shows merely an example and other optional steps may be executed therein.

In FIG. 9, the group 3 facsimile communication procedure controller 118, modem 119 and NCU 120 included in the facsimile communication unit 117 act as means for controlling the CCITT group 3 facsimile communication. Means for determining existence of the above-mentioned group 3 facsimile subaddress prior to the reception of relevant facsimile data, that is, in the phase B in FIG. 14, are included in the group 3 facsimile communication procedure controller 118. A phase C exists after the phase B and the relevant facsimile data is received in the phase C. Means for extracting a subaddress is also included in the group 3 facsimile communication procedure controller 118, the means extracting the subaddress if the existence of the subaddress is determined. The subaddress existence determined in the group 3 facsimile communication procedure controller 118 and the subaddress extracted in the same controller 118 if it exists are reported to the system controller 112. The system controller 112 then processes the subaddress existence information and the extracted subaddress if it exists in accordance with the information previously stored in the subaddress processing memory 124. The relevant facsimile data is temporarily stored in the image memory 125 as mentioned above and processed according to the above information stored in the subaddress processing memory 124 after the relevant communication has been completed. However, if the process procedure is determined so that the relevant facsimile data is to be transferred to the attached printer 114, the facsimile-data printing by means of the printer 114 may be started before the relevant communication has been completed. The procedure of the facsimile-data transfer process may comprise any of those shown in FIGS. 11, 12 and 13. Specification of any of these procedures can be input by the operator using the operation input unit 115 so that the operator arbitrarily specifies a desired procedure by handling keys of the operation input unit 115 while the operator views the operation display unit 116 for confirming the set contents. The thus input procedure is stored in the subaddress processing memory 124 and properly managed.

In the case where a relevant facsimile data is to be transferred from the communication apparatus 111 to a facsimile device such as the group 3 facsimile apparatus 131, the address of the facsimile device is determined either using the previously fixed address in the procedure numbered 03 of FIG. 11 or in the procedure numbered 13 of FIG. 12 or using the address to be determined depending on the accompanying subaddress in the procedure numbered 23 of FIG. 13. The facsimile-data transfer (output) is executed by the facsimile communication unit 117 of FIG. 9 so that the received facsimile data stored in the image memory 125 is output.

In the case where facsimile data is to be output to a printer device, either the facsimile data is output to the printer 114 connected directly to the communication apparatus 111 if the printer 114 exists or the same data is transferred to the printer 137 connected to the communication apparatus 111 via the LAN if the printer 114 does not exist. The former case procedure may be the procedure numbered 01 of FIG. 11 or that numbered 11 of FIG. 12. The latter case occurs where the relevant communication apparatus 111 comprises a facsimile mail device for example which in general does not have any directly attached printer. The latter case procedure may be the procedure numbered 02 of FIG. 11, that numbered 12 of FIG. 12 or that numbered 22 of FIG. 13. The transfer to the printer 137 of FIG. 10 is executed using the electronic mail/file transfer communication procedure controller 122 and LAN-I/F 123 of FIG. 9 in accordance with the file transfer communication procedure controlled by the electronic mail/file transfer communication procedure controller 122.

Figure 15:
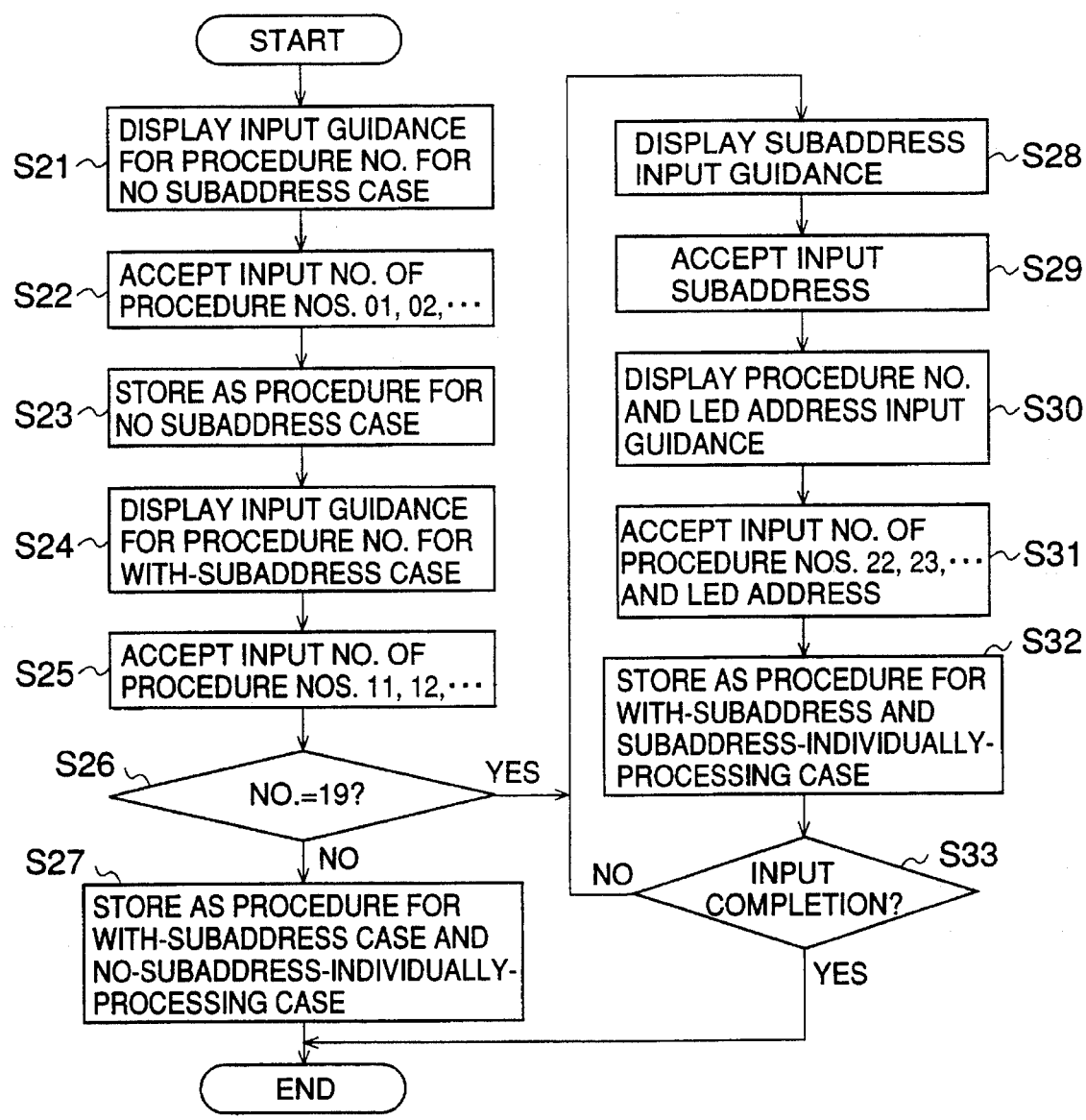
FIG. 15 shows an operation flow of a registering procedure in a received-facsimile-data output process depending on a relevant subaddress in the system shown in FIG. 9.

With reference to FIG. 15, an operation flow by which the procedures of the transfer process of the received facsimile data as described above are set is described. If the operator presses a function key for registering the transfer-process procedure using the operation input unit 115, the operation display unit 116 displays the procedure numbers and relevant transfer destinations in the case of no subaddress existing, such as those shown in FIG. 11, in S21. Then, if the operator selects any of the displayed procedure numbers using the operation input unit 115, the relevant procedure number is accepted by the system controller 112 in S22. The system controller 112 stores the accepted number in the subaddress processing memory 124 as the procedure to be performed in the case of no subaddress existing in S23.

Subsequently, the operation display unit 116 displays the procedure numbers and relevant transfer destinations in the case of the subaddress existing such as those shown in FIG. 12 in S24. Then, if the operator inputs any of the displayed procedure numbers using the operation input unit 115, the system controller 112 accepts the input number in S25. Then, the system controller 112 checks whether or not the accepted number is '19' in S26. If not, it is determined that the transfer process is to be executed in the procedure independent of the subaddress contents (may be referred to as the no-subaddress-individually-processing procedure) in the case of subaddress existing in S27. Also in S27, the input procedure number which should be any of the numbers '11' through '14' is registered in the subaddress processing memory 124 as the no-subaddress-individually-processing procedure.

On the other hand, if the input procedure number is determined to be '19' in S26, the operation display unit 116 displays a message to accept subaddress information such as that shown in FIG. 13 to be input in S28. Then, if the operator inputs certain information in response to the display, the system controller 112 accepts the input information as the subaddress information to be used as the leading (that is, pointing) information in the procedure determining method such as that of FIG. 13 in S29. Then, the operation display unit 116 displays a message to accept information concerning the relevant procedure number and led (that is, pointed-to) address such as those shown in FIG. 1B, in S30. Then, if the operator inputs information using the operation input unit 115 in response to the above display, the system controller 112 accepts the input information as the procedure number and led address in S31 and stores the thus accepted information in the subaddress processing memory 124 as a subaddress-individually-processing procedure (that is, the process to be performed is determined depending on the contents of the given subaddress) to be executed in the case of the subaddress existing, in S32. Then, in S33, the system controller 112 waits for the input completion command to be input. The process of the current cycle is terminated if the command is input.

Figure 16:
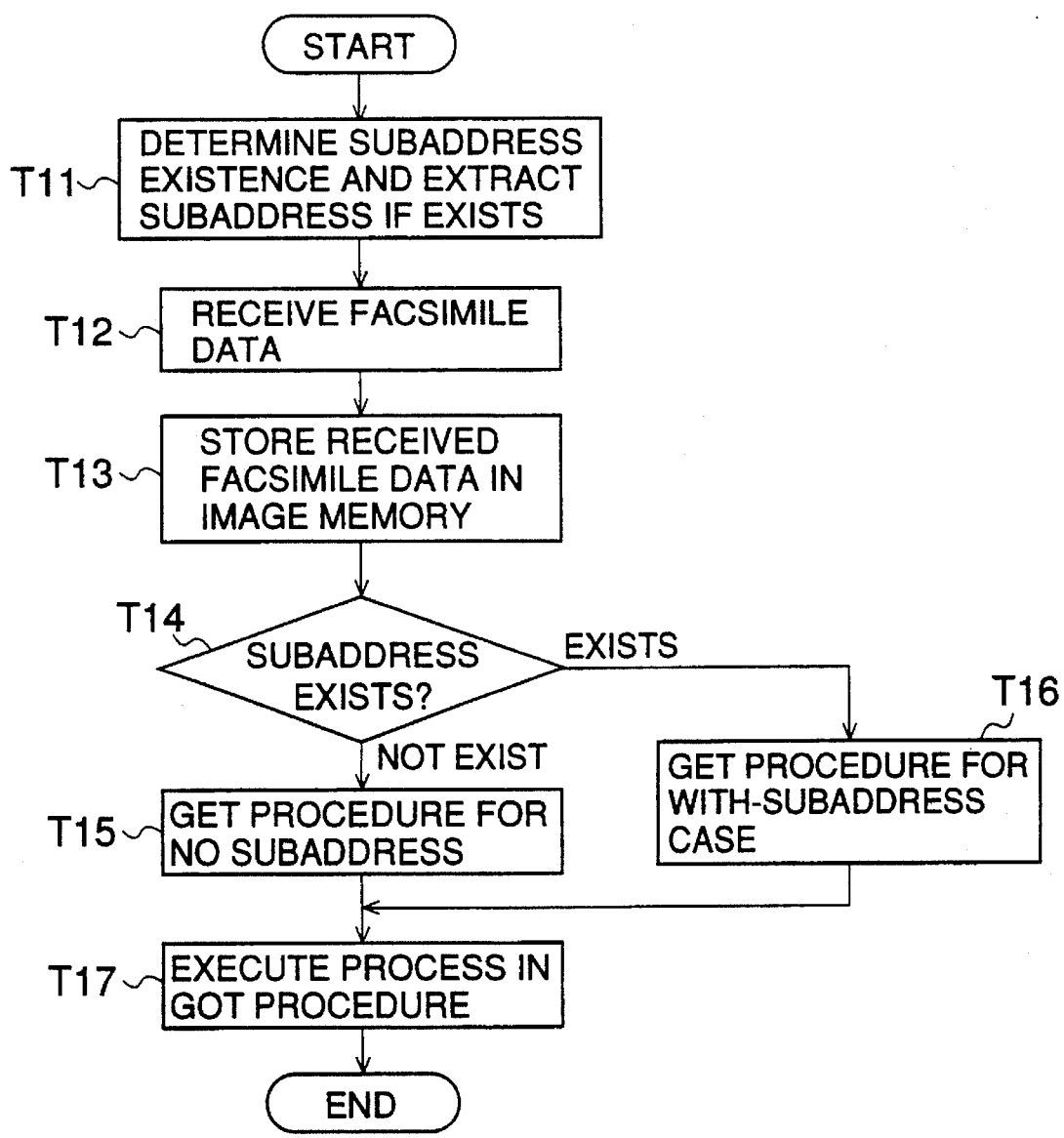
FIG. 16 shows an operation flow of a facsimile data reception process in the system shown in FIG. 9.

Operation performed by the communication apparatus 111 where the apparatus 111 is receiving facsimile data is described with reference to FIG. 16. If a call is accepted by the facsimile communication unit 117, the group 3 facsimile communication procedure controller 118 determines whether or not a subaddress exists in the received data relevant to the call and extracts the subaddress from the received data if it exists, in T11. Then, the group 3 facsimile communication procedure controller 118 receives the relevant facsimile data in T12 and stores the received data in the image memory 125 in T13. In T14, the subaddress existence is again checked. If no subaddress is determined to exist in T14, the proper facsimile-data transfer process procedure from among the procedures, for the case of no subaddress existing, shown in FIG. 11, is read from the subaddress processing memory 124 in T15. On the other hand, if a certain subaddress is determined to exist in T14, the proper facsimile-data transfer process procedure from among procedures, for the case of a certain subaddress existing, shown in FIG. 12 and FIG. 13, is read from the subaddress processing memory 124 in T16. Then, the transfer process is performed on the relevant received and stored facsimile data in accordance with the thus read procedure in T17.

Advantages obtainable from the communication apparatus in the seventh embodiment of the present invention are described.

In a case where a single facsimile apparatus or facsimile mail apparatus acting as the communication apparatus in the embodiment is used by a plurality of persons belonging to a certain office section, persons who are to receive a document may be specified using the general CCITT group 3 facsimile subaddress function. Thus, the relevant document can be distributed through the electronic mail function to the specified persons. Further, the relevant document may be printed by means of either the facsimile apparatus or the attached printer. Thus, the relevant document may be variously processed by means of the single facsimile apparatus.

As described above, the group 4 facsimile apparatus in the related art disclosed in the above Japanese Laid-Open Patent Application No.4-223656 problematically rejects incoming facsimile data which contains no subaddress. In contrast, the communication apparatus in the seventh embodiment of the present invention can accept the facsimile data accompanied by no subaddress and transfer the relevant data to the proper destination. Further, since the above facsimile apparatus in the related art treats all incoming facsimile data as mail data which is as a result to be distributed to the specified mail destinations, the incoming facsimile data is not printed unless the operator inputs a printing instruction to the apparatus. Such an operation manner may inconvenience an operator who wishes to get the relevant mail as printed matter. Another problem in the related art is that a person who has no electronic mail address cannot receive any electronic mail through this facsimile apparatus. In contrast, the communication apparatus in the seventh embodiment can automatically process a received facsimile data in accordance with the existence or non-existing of a subaddress so that the relevant facsimile data may be printed out or transferred through the facsimile function appropriately. Thus, operation efficiency can be improved.

Another problem in the related art is that since the apparatus manages all received facsimile data as electronic mail, the apparatus is required to have a construction containing a complete proper electronic-mail processing function, the apparatus being thus large scale. In contrast, the communication apparatus in the seventh embodiment simply needs to have the electronic-mail communication function, the construction thereof being thus simplified.

Further, a facsimile mail apparatus in the related art requires the operator to perform the ordering (requesting) operation so that the apparatus can provide various services, which operation normally uses the PB (pushbutton) tones. However, the operation contains difficulties such as with a service-code input operation even in a normal communication procedure. In contrast, the operator needs to simply specify the group 3 facsimile subaddress through a calling-end facsimile apparatus to the called-end communication apparatus in the seventh embodiment. Thus, the same service provision as that obtained from the above ordering operation in the normal communication procedure can be obtained. Thus, the operator needs to perform neither ordering (requesting) operation nor mail distribution operation on the called-end communication apparatus in the seventh embodiment, the operation efficiency in the mail distribution operation being thus improved.

Further, the present invention is not limited to the above described embodiments, and variations and modifications may be made without departing from the scope of the present invention.

What is claimed is:

1. A communication apparatus comprising:

communication means for performing the group 3 facsimile subaddress communication operation;

determining means for determining whether or not facsimile data received through said communication means includes group 3 facsimile subaddress(es);

subaddress processing means for processing said group 3 facsimile subaddress(es) using a predetermined procedure, if said group 3 facsimile subaddress(es) has(have) been included in said facsimile data;

storing means for storing information indicating the determination result provided by said determining means together with said facsimile data;

first registering means for previously registering a first data output manner in which said facsimile data stored in said storing means is output if the relevant determination result provided by said determining means is that no group 3 facsimile subaddress exists;

second registering means for previously registering a second data output manner in which said facsimile data stored in said storing means is output depending on the contents of said group 3 facsimile subaddress(es) if the relevant determination result provided by said determining means is that said group 3 facsimile subaddress exists;

third registering means for previously registering a third data output manner in which said facsimile data stored in said storing means is output independently of the contents of said group 3 facsimile subaddress(es) if the relevant determination result provided by said determining means is that said group 3 facsimile subaddress exists; and outputting means for outputting the data stored in said storing means in an appropriate one of said first, second and third output manners.

2. The communication apparatus according to claim 1, wherein said first, second and third registering means register said first, second and third output manners so that the destinations to which said facsimile data is output comprise facsimile apparatuses.

3. The communication apparatus according to claim 1, wherein said first, second and third registering means register said first, second and third output manners so that the destinations to which said facsimile data is output comprise printers.

4. The communication apparatus according to claim 1, wherein said first, second and third registering means register said first, second and third output manners so that the destinations to which said facsimile data is output comprise LAN (local area network) connected apparatuses.

5. The communication apparatus according to claim 1, wherein said communication apparatus comprises a facsimile mail apparatus.

6. The communication apparatus according to claim 1, wherein said communication apparatus comprises a facsimile apparatus.

7. A communication apparatus comprising:

receiving means for receiving a group 3 facsimile;

determining means for determining whether or not the received group 3 facsimile includes at least one group 3 facsimile subaddress;

subaddress analyzing means for analyzing said at least one group 3 facsimile subaddress using a predetermined procedure, if said at least one group 3 facsimile subaddress has been included in said facsimile data;

first storing means for storing a first data output manner in which the received group 3 facsimile is output if the determining means determines that no group 3 facsimile subaddress exists;

second storing means for storing a second data output manner in which the received group 3 facsimile is output depending on a content of said at least one group 3 facsimile which was determined by the subaddress analyzing means subaddress, if the determining means determines that said at least one group 3 facsimile subaddress exists;

third storing means for storing a third data output manner in which the received group 3 facsimile is output independently of the contents of said at least one group 3 facsimile subaddress which was determined by the subaddress analyzing means, if the determining means determines that said at least one group 3 facsimile subaddress exists; and outputting means for outputting the received group 3 facsimile using one of said first, second and third output manners depending on the determining result determined by the determining means and an analysis result determined by the subaddress analyzing means.

8. The communication apparatus according to claim 7, wherein said first, second and third storing means store said first, second and third output manners so that at least one destination to which said received group 3 facsimile is output comprises a facsimile apparatus.

9. The communication apparatus according to claim 7, wherein said first, second and third storing means store said first, second and third output manners so that at least one destination to which said received group 3 facsimile is output comprises a printer.

10. The communication apparatus according to claim 7, wherein said first, second and third storing means store said first, second and third output manners so that at least one destination to which said received group 3 facsimile is output comprises a LAN (local area network) connected apparatus.

11. The communication apparatus according to claim 7, wherein said communication apparatus comprises a facsimile mail apparatus.

12. The communication apparatus according to claim 7, wherein said communication apparatus comprises a facsimile apparatus.

* * * * *